Patented Jan. 6, 1953

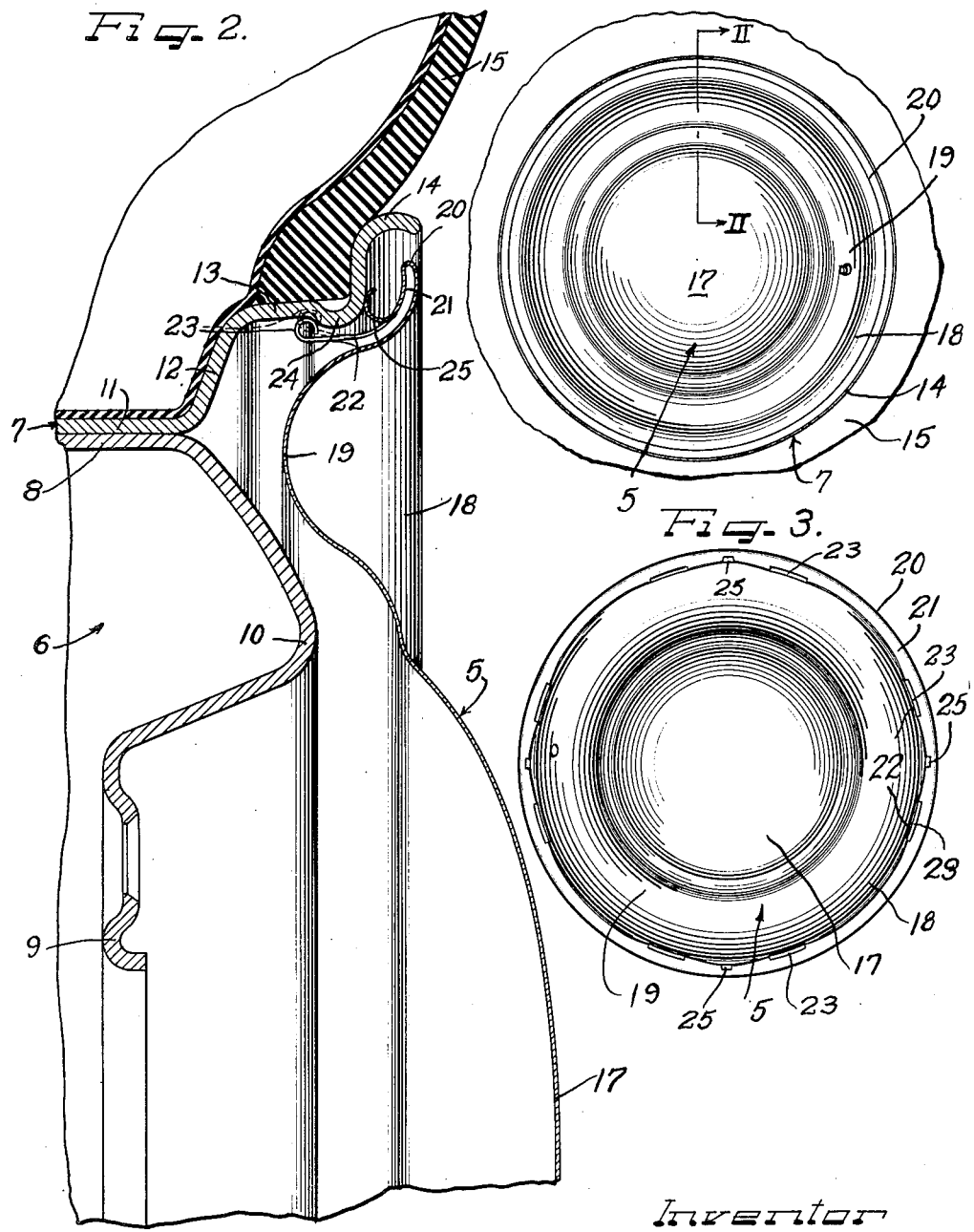

2,624,631

UNITED STATES PATENT OFFICE 2,624,631

WHEEL COVER

George Albert Lyon, Detroit, Mich.

Application January 26, 1949, Serial No. 72,980

12 Claims. (Cl. 301—37)

The present invention relates to improvements in wheel structures and more particularly to improvements relating to the protective and ornamental covering on the outer side of vehicle wheels.

An important object of the present invention is to provide an improved wheel structure wherein a protective and ornamental cover is applied in snap-on pry-off relationship to the outer side of the wheel.

Another object of the invention is to provide an improved wheel structure in which the tire rim of the wheel and an outer marginal portion of a protective and ornamental cover are cooperatively related for retaining the cover on the wheel in a novel manner.

A further object of the invention is to provide an improved self-retaining vehicle wheel cover.

According to the general features of the present invention there is provided in a wheel structure including a multi-flange tire rim and a load-sustaining body part, a wheel cover for substantially concealing the outer side of the wheel and including a marginal underturned flange having a series of inwardly projecting retaining extensions, each of which has an outwardly curled retaining bead engageable behind an annular radially inwardly protruding retaining rib on the tire rim, and a series of inwardly projecting shorter extensions on said flange engaging axially outwardly of the tire rim rib to maintain the retaining extensions in tensioned engagement with the inner side of the rib and to hold the cover in spaced relation to the outer side of the wheel.

According to other general features of the invention there is provided in the retaining extensions on the cover a substantial degree of resilience and the retaining extensions are placed under radially inward tensioned deflection in retaining engagement with the tire rim so as to hold the cover against any substantial radial movement in service but permitting some radial deflection for pry-off and as pressure relief upon striking of an obstruction by the cover.

According to yet other general features of the invention the spacing and tensioning extensions are resilient and afford cushions for permitting some axially inward resilient deflection of the cover.

Other objects, features and advantages of the present invention will be readily apparent from the following detailed description of a preferred embodiment thereof taken in conjunction with the accompanying drawings, in which:

Figure 1 is a side elevational view of a vehicle wheel structure embodying features of the present invention;

Figure 2 is an enlarged radial sectional view taken substantially on line II—II of Figure 2; and Figure 3 is a rear elevational view of the cover of Figures 1 and 2.

As shown on the drawings:

A wheel cover 5 of the type with which the present invention is concerned is adapted to be applied to the outer side of a vehicle wheel including a wheel body 6 and a tire rim 7. Both the wheel body and the tire rim are adapted to be made from appropriate gauge sheet metal stamped or rolled to shape. The wheel body may be of the type including a peripheral flange 8 and a central bolt-on flange 9 with an intermediate annular axially outwardly projecting reinforcing nose bulge 10. The tire rim is of the multi-flange, drop center type having a base flange 11 secured in a suitable manner to the peripheral flange 8 of the wheel body, a side flange 12 extending from the base flange, an intermediate flange 13 extending generally axially outwardly from the side flange, and a terminal flange 14, the latter extending generally radially outwardly and axially outwardly as is customary. The tire rim is adapted to support a pneumatic tire and tube assembly 15.

In the present instance, the wheel cover 5 is shown as of the full disk type which includes a central crown portion 17, an annular outer trim ring portion 18 and an intermediate inwardly bowed annular juncture rib 19 which affords an axially outwardly opening groove intermediate the crown and marginal or trim portions of the cover and generally simulates the general shape of the wheel including the intermediate rather large outwardly opening annular groove defined between the nose bulge 10 of the wheel body and the intermediate flange 13 of the tire rim, however, affording a smooth, decorative appearance for the outer side of the wheel and hiding the various angles, corners, crevices and attachment bolt structure of and for the wheel.

The marginal trim portion 18 of the cover is preferably of an extent substantially to cover the tire rim 7 and is preferably of generally outwardly convex cross-sectional shape, having the marginal extremity thereof turned under and presenting a smooth bead-like edge 20 for the cover on a diameter which is somewhat less than the diameter of the inner corner of the extremity of the terminal flange 14 of the tire rim.

From the finished turned edge 20, the marginal extremity of the cover extends generally radially inwardly to provide an underturned flange 21 which is preferably disposed in spaced substantially parallel relation to the inner face of the trim portion 18 of the cover. This flange 21 carries means for retaining and positioning the cover on the wheel. To this end, the flange 21 is provided with a plurality of generally radially inwardly and axially inwardly projecting flange extensions 22. These extensions 22 provide retaining fingers or tabs, each having its inner extremity turned radially outwardly upon itself to provide a relatively stiff reinforcing and retaining bead 23 engageable retainingly behind or at the axially inner side of a radially inwardly projecting annular rib 24 formed at the axially outer margin of the intermediate flange 13 of the tire rim.

As best seen in Figs. 2 and 3, the retaining finger or tab extensions 22 are formed with transversely arcuate base portions which are substantially wider than the terminal bead portions 23 thereof and flare from the bead portions toward the juncture with the flange 21. This taken together with the stiffening afforded by the radially outwardly protruding retaining beads 23, extending to the convex side of the associated retaining tab affords a high degree of stiffness and resilience for the retaining tabs. Furthermore, in the initial or normal, unmounted condition of the cover, the retaining tabs 22 extend to a frustum plane, that is flaringly radially outwardly to a limited extent and with the radially outer extremities of the retaining beads 23 extending to a diameter slightly larger than the inside diameter of the intermediate tire rim flange 13 at the inner side or base of the retaining rib 24 on the tire rim flange.

In applying the cover 5 to the wheel, the cover is generally centered with respect to the outer side of the wheel and with the retaining tab beads 23 engaging the axially outer curved side of the retaining rib 24. Then axially inward pressure is applied to the cover to cam the retaining beads 23 along the surface of the rib 24 and past the same to the axially inner side thereof, the retaining fingers or tabs 22 flexing resiliently and thus yielding sufficiently to enable the beads 23 to pass the retaining rib and then snap into retaining engagement behind the rib. In the retained engagement of the retaining beads 23 with the tire rim flange 13, the retaining tabs 22 are maintained under resilient tension by retaining the tabs under radially inward flexure, as indicated in Fig. 2 which shows how the retaining tabs 22 are flexed into the full line position from the dash outline position.

In order to afford a cushioned, rattle-free and spaced relationship of the cover 5 to the outer side of the wheel, means are provided in the form of limit extensions 25 from the cover flange 21, shorter than the retaining extension tabs 22 and in the mounted condition of the cover engaging against the base portion of the terminal flange 14 of the tire rim at the outer side of the retaining rib 24. By preference the limit extensions or tabs 25 are formed as curled fingers extending generally axially inwardly and radially outwardly to engage against the tire rim slidably. The limit fingers 25 are possessed of a fair degree of resilience so that by proper relationship of their maximum inward extension relative to the axially outer sides of the retaining beads 23, the limit fingers 25 are placed under tension as an incident to snapping of the beads 23 into retaining engagement behind the retaining rib 24. The resilient reaction of the limit fingers 25 thus tends to draw the retaining beads 23 snugly against the inner side of the retaining rib 24. At the same time, the limit fingers 25 afford cushions which will resiliently resist while nevertheless yielding for pressure relief when the wheel cover strikes an obstruction or curb.

In addition, the limit fingers 25 maintain the marginal extremity of the cover in axially outwardly spaced relation to the tire rim and more particularly the base portion of the terminal flange 14. Hence, a space or gap is afforded between the cover and the tire rim for air circulation or ventilation purposes and for centrifugal ejection of foreign matter or dirt which may get behind the cover in service. The retaining finger or tab extensions 22, of course, retain the cover in centered relation with respect to the wheel and assure a substantially uniform gap between the edge 20 of the cover and the extremity of the terminal flange 14. By preference, further, the construction and arrangement is such that the marginal extremity of the trim portion 18 of the cover lies within the plane of the terminal flange extremity so as to be subtantially protected thereby against curbing or like damage. The space behind the marginal flange 21 is ample to accommodate wheel balancing weight where they are used.

From Figure 3 it will be observed that the retaining finger extensions 22 and the limit or spacing finger extensions 25 are disposed in symmetrical pattern about the margin of the cover, there preferably being two of the retaining extensions 22 for each of the limit extensions 25. As shown, each pair of retaining extensions 22 is located in spaced relation with one of the limit fingers 25 therebetween. Four equally spaced groups of the retaining and limit extensions or tabs is shown, but it will be understood that a larger or smaller number of groups may be employed.

Due to the resiliency and individual flexibility of the retaining finger extensions 22 and the spaced relation thereof to the adjacent juncture rib portion 19 of the cover, the cover is efficiently self-centering and thus independent of various manufacturing tolerances or inaccuracies that may be present in the wheel. This feature is further enhanced by the spaced relation to all parts of the wheel maintained through the spacing tabs or fingers 25. Thus, in a sense, the cover may be considered as substantially floating, self-centering, in addition to self-retaining. Yet it is quite efficiently held on the wheel by the gripping engagement afforded by the retaining tabs 22 and more particularly the retaining beads 23 thereof and the limit and cushioning fingers 25.

To remove the cover from the wheel a pry-off tool, such as a screw driver or the like (not shown), may be applied behind the reinforced, finished turned edge 20 of the cover and pry-off force applied to the cover while fulcruming the tool on the extremity of the terminal flange 14 of the tire rim. Such pry-off force will cause the flexible retaining fingers 22 to yield and cam the retaining beads 23 thereof outwardly past the retaining rib 24 to release the cover. The cover may then be quickly reapplied to the wheel or to another wheel in the manner previously described.

I claim as my invention:

1. In a wheel structure including a multi-flange tire rim and a load-sustaining body part, a wheel cover for substantially concealing the outer side of the wheel and including a marginal underturned flange having a series of inwardly projecting retaining extensions, each of which has an outwardly curled retaining bead engageable behind an annular radially inwardly protruding retaining rib on the tire rim, and a series of inwardly projecting shorter extensions on said flange engaging axially outwardly of the tire rim rib to maintain the retaining extensions in tensioned engagement with the inner side of the rib and to hold the cover in spaced relation to the outer side of the wheel.

2. In a wheel structure including a multi-flange tire rim and a load-sustaining body part, a wheel cover for substantially concealing the outer side of the wheel and including a marginal underturned flange having a series of inwardly projecting retaining extensions, each of which has an outwardly curled retaining bead engageable behind an annular radially inwardly protruding retaining rib on the tire rim, and a series of inwardly projecting shorter extensions on said flange engaging axially outwardly of the tire rim rib to maintain the retaining extensions in tensioned engagement with the inner side of the rib and to hold the cover in spaced relation to the outer side of the wheel, said retaining extensions on the cover having a substantial degree of resilience and being placed under radially inward tensioned deflection in retaining engagement with the tire rim so as to hold the cover against any substantial radial movement in service but permitting some radial deflection for pry-off and as pressure relief upon striking of an obstruction by the cover.

3. In a wheel structure including a multi-flange tire rim and a load-sustaining body part, a wheel cover for substantially concealing the outer side of the wheel and including a marginal underturned flange having a series of inwardly projecting retaining extensions, each of which has an outwardly curled retaining bead engageable behind an annular radially inwardly protruding retaining rib on the tire rim, and a series of inwardly projecting shorter extensions on said flange engaging axially outwardly of the tire rim rib to maintain the retaining extensions in tensioned engagement with the inner side of the rib and to hold the cover in spaced relation to the outer side of the wheel, the shorter spacing and tensioning extensions being resilient and affording cushions for permitting some axially inward resilient deflection of the cover.

4. In a wheel structure including a load-sustaining body part and a multi-flange tire rim, the tire rim including an intermediate generally axially outwardly extending flange and a terminal flange, the juncture of the terminal and intermediate flanges comprising a generally radially inwardly extending rounded rib, a wheel cover for substantially concealing the outer side of the wheel and including retaining means at the outer margin thereof concealed therebehind and comprising a series of inwardly extending retaining fingers having generally radially outwardly projecting retaining terminal portions engaging behind the tire rim rib, and a series of limit fingers engaging the tire rim axially outwardly of the retaining rib and cooperating resiliently with said retaining terminal portions to effect a generally axially outward retaining grip of the retaining terminal portions against the axially inner side of the retaining rib.

5. In a wheel structure including a load-sustaining body part and a multi-flange tire rim, the tire rim including an intermediate generally axially outwardly extending flange and a terminal flange, the juncture of the terminal and intermediate flanges comprising a generally radially inwardly extending rounded rib, a wheel cover for substantially concealing the outer side of the wheel and including retaining means at the outer margin thereof concealed therebehind and comprising a series of inwardly extending retaining fingers having generally radially outwardly projecting retaining terminal portions engaging behind the tire rim rib, and a series of limit fingers engaging the tire rim axially outwardly of the retaining rib and cooperating resiliently with said retaining terminal portions to effect a generally axially outward retaining grip of the retaining terminal portions against the axially inner side of the retaining rib, said retaining fingers being in spaced pairs and the limit fingers being individually disposed between each of said pairs of retaining fingers.

6. In a wheel cover of the self-retaining type, a cover member having concealed behind the outer margin thereof a plurality of pairs of generally axially inwardly extending retaining finger extensions each of which has the extremity thereof formed with a rounded radially outwardly projecting formation engageable cammingly behind a retaining rib on a tire rim of a wheel to which the cover may be applied, and a limit finger between each pair of retaining finger extensions and engageable with the tire rim to limit axial inward disposition of the cover on the wheel.

7. In a wheel cover of the self-retaining type, a cover member having concealed behind the outer margin thereof a plurality of pairs of generally axially inwardly extending retaining finger extensions each of which has the extremity thereof formed with a rounded radially outwardly projecting formation engageable cammingly behind a retaining rib on a tire rim of a wheel to which the cover may be applied, and a limit finger between each pair of retaining finger extensions and engageable with the tire rim to limit axial inward disposition of the cover on the wheel, the limit fingers being curled generally axially inwardly and radially outwardly and affording sliding contact with the tire rim.

8. In a vehicle wheel cover, a cover member having a plurality of rearwardly extending attachment fingers including outwardly curled terminal retaining beads, and a plurality of limit fingers separate from said attachment fingers and spaced axially outwardly relative to said retaining beads and having free end portions spaced from the cover member.

9. A wheel cover for disposition at the outer side of a wheel including a tire rim having an intermediate generally axially outwardly extending flange with a radially inwardly projecting retaining rib formation at its axially outer margin and merging with a terminal flange on the tire rim, the cover including a circular cover member having a marginal retaining structure therebehind comprising a plurality of generally axially inwardly extending and radially outwardly flaring retaining fingers having the terminal portions thereof formed as retaining beads engageable behind the retaining rib on the tire rim and normally extending to a diameter greater than the inner diameter of the tire rim intermediate flange, said retaining fingers being outwardly bowed in transverse cross-section and resiliently deflectable radially inwardly in response to retaining engagement with the tire rim, and means cooperatively related to said fingers and carried by the cover margin engageable with the terminal flange portion of the tire rim and operative to retain the terminal beads on the retaining fingers in resilient tensioned cover retaining engagement with the inner side of the retaining rib.

10. In a wheel structure including a tire rim having an intermediate flange and a terminal flange with the juncture of the flanges provided with a radially inwardly extending cover retaining rib, a wheel cover comprising a member for substantially concealing the outer side of the tire rim and having behind the margin thereof a plurality of retaining fingers including retaining portions formed on a radius and engageable behind the retaining rim, said fingers being placed under resilient tension by the retaining engagement with the tire rim, and cushioning means located axially and radially outwardly from the retaining fingers behind said marginal portion of the cover and engaging with the terminal flange adjacent to the outer side of said rib and cooperating with the retaining fingers to support the cover in self-centering, cushioned spaced relation to the outer side of the tire rim.

11. In a vehicle wheel cover, a circular cover member having a plurality of rearwardly extending attachment fingers, said fingers having retaining terminal portions rounded in cross-section, and a plurality of limit fingers spaced axially outwardly relative to said terminal portions and having free distal end portions spaced from the cover member and flexibly movable relative to the cover member.

12. In a wheel cover of the self-retaining type, a circular cover member having concealed behind the outer margin thereof a generally return bent generally radially inwardly extending flange, said flange having generally axially and radially extending retaining fingers adapted to engage with a generally radially facing portion of a wheel to which the cover may be applied, and a plurality of limit fingers also extending from said flange but spaced axially outwardly relative to the wheel engaging portions of the retaining fingers, said limit fingers being curled to present rounded shoulders to an opposing portion of the wheel.

GEORGE ALBERT LYON.

REFERENCES CITED

The following references are of record in the file of this patent:

UNITED STATES PATENTS

| Number | Name | Date |
|---|---|---|
| 2,174,087 | Horn | Sept. 26, 1939 |